United States Patent
Wörner

(10) Patent No.: US 6,717,170 B2
(45) Date of Patent: Apr. 6, 2004

(54) OPTOELECTRONIC APPARATUS

(75) Inventor: Jörg Wörner, Weilheim/Teck (DE)

(73) Assignee: Leuze Electronic GmbH & Co., Owen/Tech (DE)

( * ) Notice: Subject to any disclaimer, the term of this patent is extended or adjusted under 35 U.S.C. 154(b) by 125 days.

(21) Appl. No.: 09/916,231

(22) Filed: Jul. 27, 2001

(65) Prior Publication Data

US 2002/0018285 A1 Feb. 14, 2002

(30) Foreign Application Priority Data

Jul. 27, 2000 (DE) .......................... 100 36 538

(51) Int. Cl.$^7$ ................................. G01V 8/00
(52) U.S. Cl. .................. 250/559.38; 356/5.01
(58) Field of Search .................. 356/5.01–5.15, 356/71, 364, 625, 616, 618, 5.07; 250/221, 216, 214 R, 205, 556, 237 G, 229, 559.38, 559.39, 559.29, 559.31, 559.32; 340/600, 619, 630

(56) References Cited

U.S. PATENT DOCUMENTS

| | | | | |
|---|---|---|---|---|
| 4,699,508 A | * | 10/1987 | Bolkow et al. | 356/5.07 |
| 4,734,587 A | * | 3/1988 | Schwarte | 250/559.38 |
| 4,737,624 A | * | 4/1988 | Schwarte | 250/216 |
| 5,180,922 A | * | 1/1993 | Hug | 250/559.38 |
| 6,088,085 A | * | 7/2000 | Wetteborn | 356/5.01 |
| 6,265,725 B1 | * | 7/2001 | Moll et al. | 250/559.38 |
| 6,509,958 B2 | * | 1/2003 | Pierenkemper | 356/5.01 |

FOREIGN PATENT DOCUMENTS

| | | |
|---|---|---|
| CH | 649 633 A5 | 5/1985 |
| DE | 27 23 835 A1 | 12/1978 |
| DE | 32 19 452 C2 | 4/1986 |
| DE | 35 40 157 C2 | 7/1988 |
| DE | 31 03 567 C2 | 10/1988 |
| DE | 41 33 196 A1 | 4/1992 |
| DE | 44 19 472 A1 | 12/1994 |
| DE | 195 13 823 A1 | 10/1996 |
| DE | 195 20 167 A1 | 12/1996 |
| DE | 196 07 345 A1 | 8/1997 |
| DE | 197 04 340 A1 | 8/1998 |
| DE | 197 09 906 A1 | 9/1998 |
| EP | 0 933 649 A3 | 8/1999 |

* cited by examiner

Primary Examiner—David Porta
Assistant Examiner—Patrick J. Lee
(74) Attorney, Agent, or Firm—Venable, LLP; Robert Kinberg; Catherine M. Voorhees

(57) ABSTRACT

An optoelectronic apparatus for detecting objects in a monitored region includes a transmitter that emits transmission light, a receiver that receives a reflected light, and an evaluation unit, in which the transit time $t_o$ of the transmission light that is guided in the monitored region and reflected back, as a reflected light, by an object is evaluated. The transmitter emits the transmission light in the form of a sequence of transmission light pulses. A portion of the light quantity of a transmission light pulse is coupled out as a reference transmission light pulse and guided by way of a reference path to the receiver. The transit time $t_R$ of the reference transmission light pulse guided as a reference reflected light pulse to the receiver is determined in the evaluation unit. The transit-time difference $t_o - t_R$ is used to determine the distance of an object.

14 Claims, 4 Drawing Sheets

OPTOELECTRONIC APPARATUS

CROSS REFERENCE TO RELATED APPLICATION

This application claims the priority of German Application No. 100 36 538.8 filed Jul. 27, 2000, which is incorporated herein by reference.

BACKGROUND OF THE INVENTION

The invention relates to an optoelectronic apparatus having a transmitter that emits transmission light, a receiver that receives reflected light, and an evaluation unit, in which the transit time $t_o$ of the transmission light that is guided in the monitored region and reflected back, as a reflected light, by an object is evaluated for determining the distance of the object.

An optoelectronic apparatus of this type is known from DE 43 41 080 C1. For locating objects in a monitored region, the optoelectronic apparatus has a transmitter that emits transmission light beams, and a receiver, which is embodied as a location-resolving detector and receives reflection light beams, the transmitter and receiver being integrated into a common housing. The transmission light beams are diverted by a diverting unit, and periodically guided inside a monitored region. A phase measurement is employed in determining the distance of objects in the monitored region. The phase measurement is used to determine the transit-time difference of the received reflection light beams reflected by an object relative to the transmission light beams emitted by the transmitter.

Outside of the monitored region, a test object is disposed inside the housing. For checking the function of the optoelectronic apparatus, the transmission light beams that the test object reflects back to the receiver as reflection light beams are evaluated in terms of their amplitude in an evaluation unit.

Thus, it is possible to verify whether the transmitter or receiver is functional. Disturbances caused by the aging or contamination of components can also be ascertained with the test measurement using the test object.

The test measurement using the test object is not, however, conclusive in terms of whether the distance measurement for locating the objects in the monitored region is error-free. The test measurement cannot eliminate errors that may occur in the distance measurement.

SUMMARY OF THE INVENTION

It is an object of the invention to embody an optoelectronic apparatus of the type mentioned at the outset to assure the highest possible precision and most reliable verification in objects in the monitored region.

The optoelectronic apparatus according to the invention accomplishes this object with the transmitter emitting the transmission light in the form of a sequence of transmission light pulses where a portion of the light quantity of a transmission light pulse is coupled out as a reference transmission light pulse and guided by way of a reference path to the receiver; and an evaluation unit determines the transit time $t_R$ of the reference transmission light pulse guided as a reference reflected light pulse to the receiver and the transit-time difference $t_o - T_R$ to determine the distance of an object.

That is, the optoelectronic apparatus of the invention has a distance sensor that operates according to the pulse-transit-time method. The distances of objects from the optoelectronic apparatus are ascertained through the determination of the transit time $t_o$ of the transmission light pulses that are emitted by the transmitter and reflected, as reflected light pulses, by objects inside the monitored region onto the receiver of the distance sensor.

In accordance with the invention, a portion of the light quantity is coupled out, as a reference transmission light pulse, from the transmission light pulses, and guided to the receiver by way of a reference path.

In the evaluation unit of the optoelectronic apparatus, the transit time $T_R$ of the reference transmission light pulse that was guided as a reference reflected light pulse to the receiver is determined. Then, the transit-time difference $t_o - T_R$ is used to determine the distance of an object.

The primary concept of the invention, therefore, is to associate all of the distance measurements taken with the transmission light pulses with a reference measurement taken with the reference transmission light pulse. The length of the reference path is known in advance and, advantageously, stored in the evaluation unit.

The evaluation of the transit-time difference $t_o - T_R$ extensively eliminates internal measurement errors occurring in the distance measurement. One cause of such measurement errors is that the emission of a transmission light pulse does not occur simultaneously with the actuation of the transmitter due to a trigger pulse or the like. Instead, the transmission light pulse is emitted with a slight delay due to the finite transit times of the electrical signals in the individual components. These transit times exhibit variations as a result of fluctuations in temperature or operating voltage, or because of aging of the components.

The same is true for the registration of the reflected light pulses at the receiver. The conversion of the pulses into electrical reflection signals, and their amplification, is affected by delay times, which are likewise subjected to fluctuations caused by interfering influences.

In the ascertainment of the transit times $t_o$ for determining the distance of objects in the monitored region, and the determination of the transit times $T_R$ in the reference measurement, the same delay times that are affected by fluctuations are superposed over the distance-measurement values. These disturbance-influenced delay times are eliminated in the formation of the transit-time difference $t_o - T_R$, which considerably increases the precision and reproducibility of the distance measurement.

A particular advantage is that the referencing of the distance measurement is performed continuously for all of the transmission light pulses guided into the monitored region.

This advantage is also attained if a diverting unit periodically guides the transmission light pulses into the monitored region. Then, for creating a reference measurement for each diversion position of the diverting unit, a reference transmission light pulse is coupled out of a transmission light pulse that has been guided into the monitored region.

Another special advantage is that the coupling-out of the reference transmission light pulse does not limit the usable monitored region.

If the diverting unit is formed by a tilted mirror, for example, which periodically guides the transmission light pulses inside a full circle in an angular range of 0° to 360°, no separate angular range need be reserved for the reference measurement. Rather, the entire angular range covered by the transmission light pulses is available for detecting objects.

A further essential advantage of the apparatus according to the invention is that the distance measurement within the entire monitored region is continuously monitored through the continuous referencing of the object detection by means of the reference measurements taken with the reference transmission light pulses.

Thus, the requirements for the use of the optoelectronic apparatus in the field of security technology and personnel safety can easily be met. A notable advantage is that, with the reference measurements taken in accordance with the invention, a multi-channel design of the components for determining the transit-time differences can be omitted.

BRIEF DESCRIPTION OF THE DRAWINGS

The invention is described below in conjunction with the drawings in which.

DETAILED DESCRIPTION OF THE INVENTION

Figure 1:
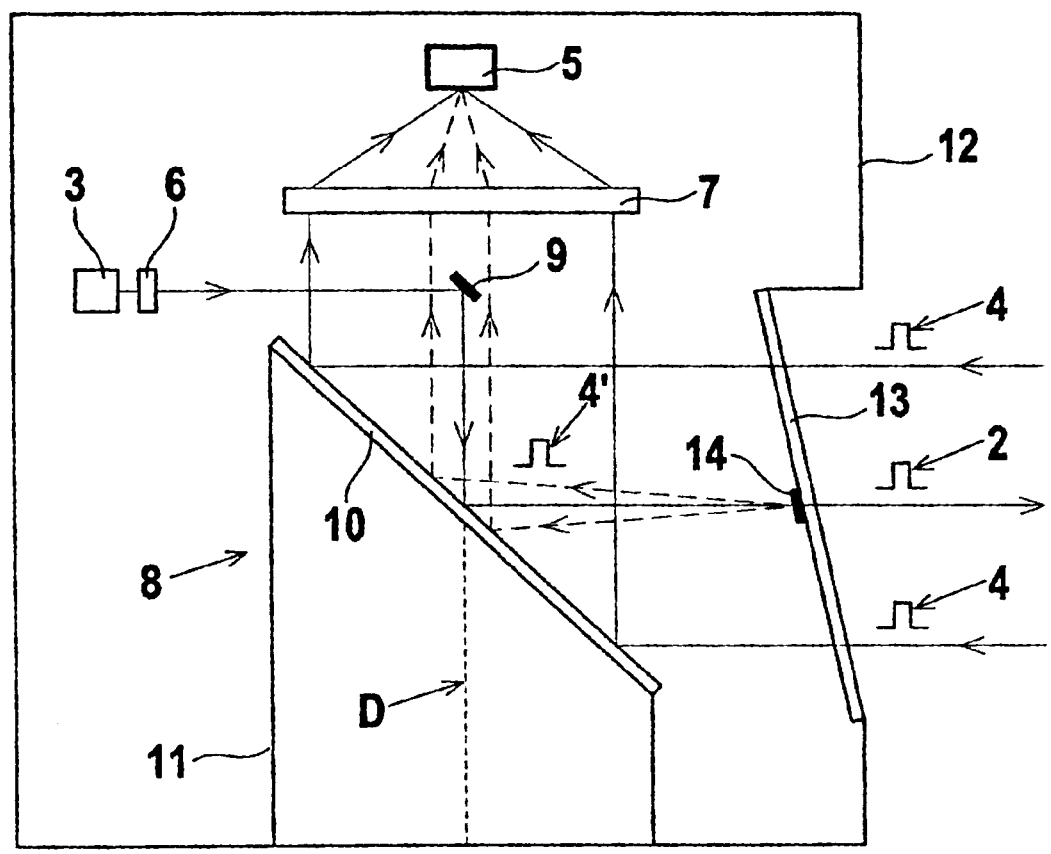
FIG. 1 is a longitudinal section through the optoelectronic apparatus according to the invention.

FIG. 1 schematically illustrates the design of an embodiment of the optoelectronic apparatus 1 of the invention for detecting objects in a monitored region. Inanimate objects, as well as and especially persons entering the monitored region, are detected as objects in the monitored region.

The optoelectronic apparatus 1 has a distance sensor, which operates according to the pulse-transit-time method and includes a transmitter 3 that emits transmission light pulses 2 and a receiver 5 that receives light pulses 4 reflected by an object in the monitored region. The transmitter 3 is formed by a laser diode, for example. A photodiode or the like is provided as the receiver 5.

For forming the beam of the transmission light pulses 2, a transmission optics 6 is disposed downstream of the transmitter 3. For focusing the reflected light pulses 4 onto the receiver 5, a receiving optics 7 is disposed upstream of the receiver. The transmitter 3 and the receiver 5 are connected to an evaluation unit, not shown, which is formed by a microprocessor or the like.

For determining the distances of objects in the monitored region, the transit time $t_o$ of the received, reflected light pulses 4 that are directed at an object and reflected back to the receiver 5 are determined. In the evaluation unit, the corresponding distance values are calculated from the transit times.

The transmission light pulses 2 and the received light pulses 4 reflected back from an object to the apparatus 1 are guided by a diverting unit 8. In the present embodiment, the transmission light pulses 2 are directed at the diverting unit 8 by way of a stationary mirror 9. In this embodiment, the diverting unit 8 comprises a tilted mirror 10, which is seated on a base 11 that can rotate about a vertical axis of rotation D. A motor, not shown, sets the base 11 into a rotational movement with a constant rpm. The tilted mirror 10 guides both the transmission light pulses 2 emitted by the transmitter 3 and the reception light pulses 4 reflected by an object. In principle, the diverting unit 8 can also include a plurality of tilted mirrors 10, in which instance the transmission light pulses 2 and the received, reflected light pulses 4 can be guided via separate diverting mirrors 10.

The optoelectronic apparatus 1 is integrated into a housing 12 having on its front side an exit window 13, through which the transmission light pulses 2 are guided into the monitored region, and through which the reflected light pulses 4 are guided back to the apparatus 1.

Figure 2:
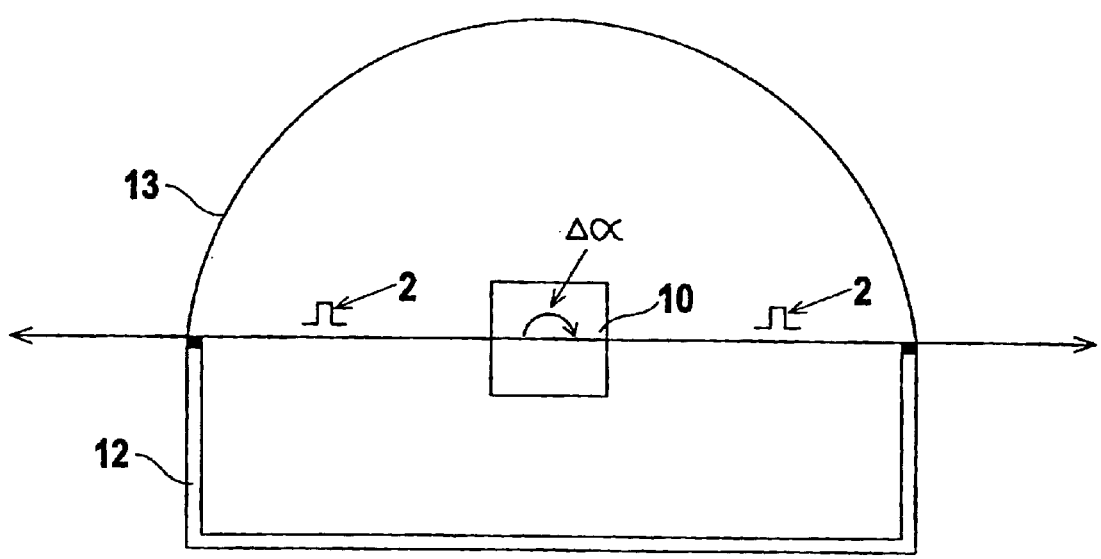
FIG. 2 is a cross-section through the optoelectronic apparatus according to FIG. 1.

As can be seen from FIG. 2, the exit window 13 extends in the circumferential direction of the housing 12, along a circular arc, and over an angular range of $\Delta\alpha=180°$. The transmission light pulses 2 diverted at the diverting unit 8 are periodically guided inside the entire angular range of $360°$.

The transmission light pulses 2 are guided inside the angular range $\Delta\alpha$ between $0°$ and $180°$, through the exit window 13 and into the monitored region located in a horizontal plane. A portion of the transmission light pulses 2, in contrast, are guided inside the housing 12 in the angular range between $180°$ and $360°$.

In accordance with the invention, a portion of the light quantity is coupled out of each transmission light pulse 2 as a reference transmission light pulse 2', and used for a reference measurement. To this end, the reference transmission light pulse 2' is guided, as the reference reflected light pulse 4', back to the receiver 5.

Figure 3:
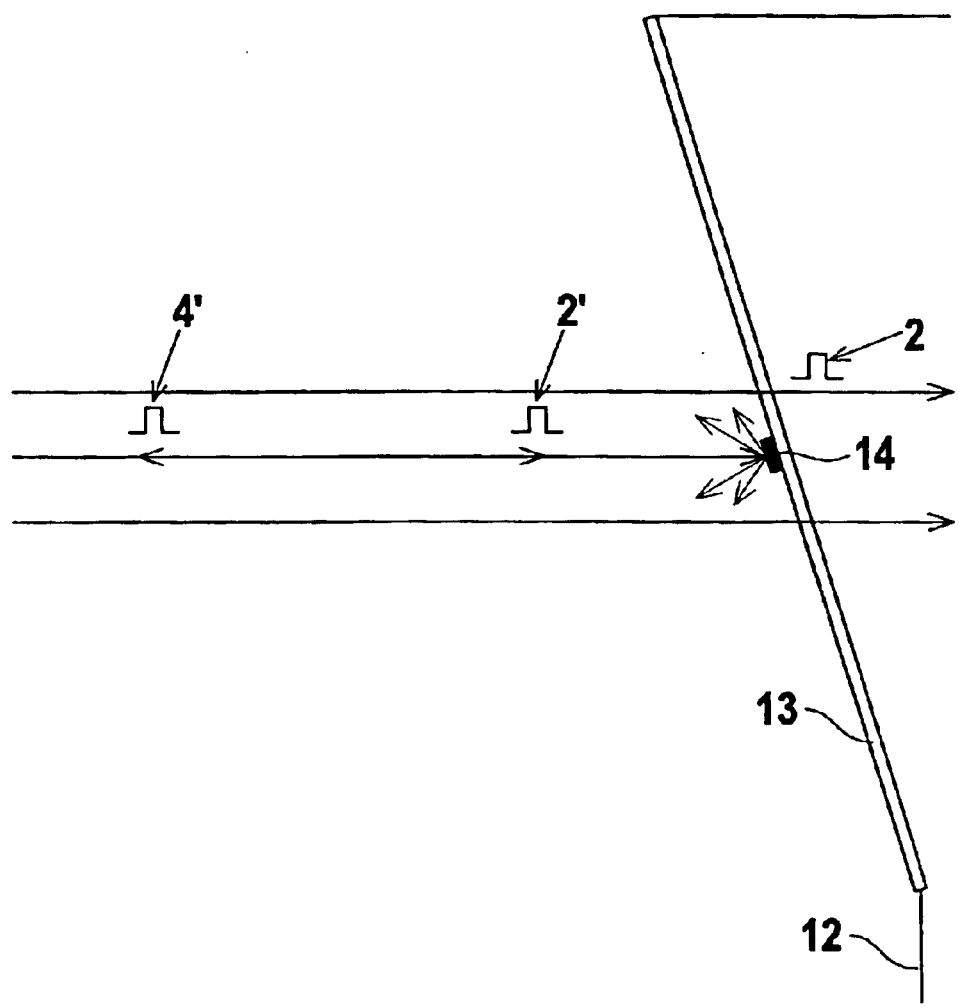
FIG. 3 is a longitudinal section through the exit window of the apparatus according to FIGS. 1 and 2, with a reflection surface for coupling out a reference transmission light pulse.

FIG. 3 illustrates an example of coupling out a reference transmission light pulse 2' in this manner. In this case, a reflection surface 14 is provided in the center of the exit window 13. The width of the reflection surface 14 is significantly smaller than the beam diameter of the transmission light pulses 2. The reflection surface 14 extends in the circumferential direction over the entire length of the exit window 13. The reflection surface 14 is formed by the surface of a coating applied to the inside of the exit window 13, for example. As an alternative, a region of the exit opening 13 can be roughened to produce the reflection surface 14. In any event, the portion of a transmission light pulse 2 incident on the reflection surface 14 is reflected diffusely and guided to the receiver 5 via the diverting unit 8. Because the reflection surface 14 extends over the entire length of the exit window 13, in each angular position of the diverting unit 8, the same portion of a transmission light pulse 2 is coupled out due to reflection by the reflection surface 14, and guided as a reference reflected light pulse 4' to the receiver 5.

In principle, the reference transmission light pulses 2' can also be guided from the transmitter 3 to the receiver 5 by way of a light waveguide or the like, not shown. The light waveguide, which is embodied, for example, as an optical fiber, has a light-entrance surface that is downstream of the transmitter 3, and by way of which a defined portion of the light quantity of a transmission light pulse 2 is coupled into the light waveguide. An advantage of this is that the reference transmission light pulse 2' need not be guided by way of the diverting unit 8, and is guided directly from the transmitter 3 to the receiver 5.

In any case, the reference transmission light pulses 2' are guided completely inside the housing 12, and the reference path that is traversed by a reference transmission light pulse 2' from the transmitter 3 to the receiver 5 is known and stored as a parameter in the evaluation unit.

According to the invention, for determining the distance of objects in the monitored region, the transit time $t_o$ of the transmitted light pulses 2 is not evaluated directly; but, the transit-time difference $t_o-T_R$ between a transmission light pulse 2 and the respective, associated reference transmission light pulse 2' is. If the light path of the reference transmission light pulse 2' is known, the object distance can be determined from this transit-time difference in the evaluation unit.

Figure 4:
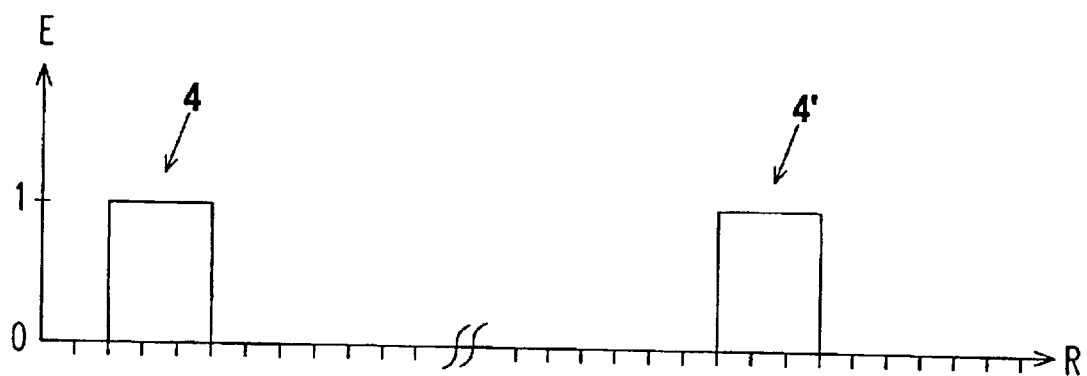
FIG. 4 is a first diagram for evaluating the transit times of the transmission light pulses and the reference transmission light pulses of the apparatus according to FIGS. 1 through 3.
Figure 5:
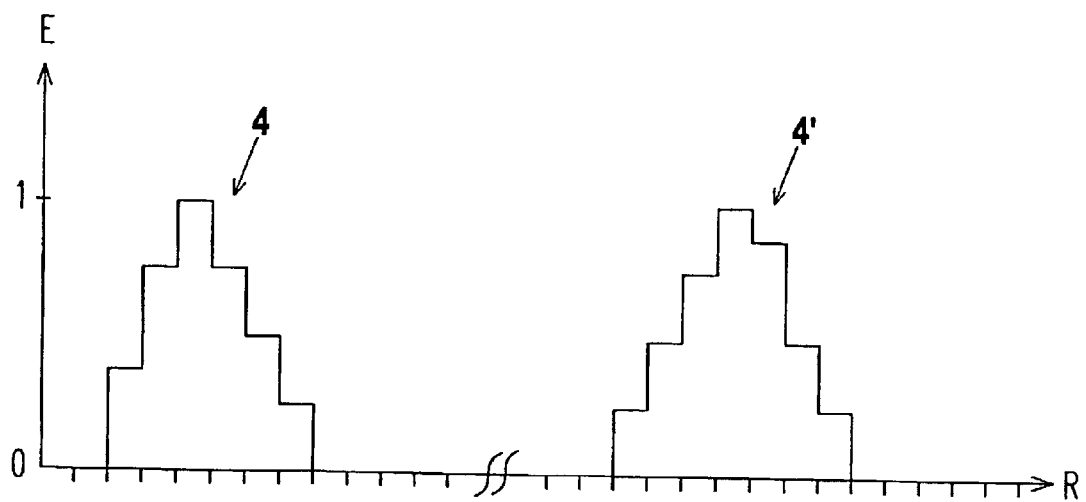
FIG. 5 is a second diagram for evaluating the transit times of the transmission light pulses and the reference transmission light pulses of the apparatus according to FIGS. 1 through 3.

FIGS. 4 and 5 illustrate two exemplary embodiments for evaluating the transit-time differences $t_o-T_R$ in respective schematic diagrams.

In both cases, the analog reflected signal generated by the received, reflected light pulses 4 and reference reflected light pulses 4', respectively, that are incident on the receiver 5 are quantized. The quantized sequence E of reflection signals corresponding to the temporal course of the reception signal is then read into the individual registers R of a memory element, not shown. The memory element can be formed by a semiconductor memory or a CCD array.

As shown in FIGS. 4 and 5, the reflection-signal sequence E containing a reflected light pulse 4 and the associated reference reflected light pulses 4' is read into the register R of the memory element. The signal values of the quantized reflection-signal sequence E stored in the individual registers R are read out cyclically by an oscillator clock and evaluated in the evaluation unit. For determining the transit-time difference $t_o-T_R$, the register positions that define the positions of the reflected light pulse 4 or the reference reflected reception light pulse 4' are determined. If the clock rate at which the reflection-signal sequence E is read into the registers R is known, the difference between the register positions of the reflected light pulse 4 and the associated reference reflected light pulse 4' results in the transit-time difference $t_o-T_R$.

FIG. 4 illustrates a first embodiment of this type of evaluation. In this instance, the analog reflection signal is converted into a binary-signal sequence by a threshold-value unit, not shown. In the presence of a reflected light pulse 4 or a reference reflected light pulse 4', the reflection-signal sequence E quantized in this manner assumes the value of 1; otherwise, it assumes the value of 0. The register position that defines the position of the reflected light pulse 4 or the reference reflected light pulse 4' is preferably predetermined by the center of the respective reflected light pulse 4 or reference reflected light pulse 4'.

FIG. 5 depicts a second embodiment of this type of evaluation. In this case, the analog reflection signal is quantized by an analog-digital converter, also not shown. Corresponding to the word width n of the analog-digital converter, the amplitude of the analog reflection signal is imaged onto $2^n$ discrete amplitude values of the quantized reflection-signal sequence E. An analog-digital converter having a word width of n=8 is preferably used.

FIG. 5 is a schematic depiction of the amplitude courses of the reflection-signal sequence E that were generated with the analog-digital converter and appear in discrete stages, with a reflected light pulse 4 and an associated reference reflected light pulse 4'.

For determining the transit-time differences $t_o-T_R$, either the positions of the maxima or the positions of the centers of gravity of the reflected light pulse 4 and the reference reflected light pulse 4' are determined. The differences of the corresponding register positions again produce the transit-time difference $t_o-T_R$.

Because the quantizing of the analog reflection signal by means of an analog-digital converter having a sufficiently large word width yields a distinctly more detailed course of the amplitudes of the received reflected light pulses 4 and reference reflected light pulses 4' than is possible with the use of a threshold-value unit, this method of determining the transit-time difference is far more precise.

As an alternative, a time-measuring module, not shown, can be used for determining the transit-time difference $t_o-T_R$. In this case, the reflected light pulse 4 and an associated reference reflected light pulse 4' are read into separate inputs of this time-measurement module. These two inputs are preferably formed by the start and stop inputs of the time-measurement module.

It will be understood that the above description of the present invention is susceptible to various modifications, changes and adaptations, and the same are tended to be comprehended within the meaning and range of equivalents of the appended claims.

I claim:

1. An optoelectronic apparatus for detecting objects in a monitored region comprising:

a transmitter that emits transmission light that is guided into the monitored region, the emitted transmission light being in the form of a sequence of transmission light pulses;

a diverting unit that periodically guides transmission light pulses into the monitored region;

means for coupling out a portion of the light quantity of a transmission light pulse as a reference transmission light pulse so that for each diversion of a transmission light pulse by the diverting unit, a reference transmission light pulse is coupled out of the transmission light pulse;

a receiver that receives reflected light including transmission light pulses reflected by an object in the monitored region and respective reference transmission light pulses which are guided by way of a reference path to the receiver;

a housing having an exit window wherein the transmitter, the receiver and the diverting unit are situated in the housing so that the transmission light pulses diverted at the diverting unit are guided into the monitored region by way of the exit window; and wherein the coupling-out means is a reflection surface disposed at the exit window, the reflection surface reflecting a portion of the light quantity of the transmission light pulses as the reference transmission light pulse back to the receiver; and an evaluation unit connected to the transmitter and the receiver, said evaluation unit determining transit time $t_O$ of the reflected transmission light pulse, and transit time $t_R$ of the respective, reference transmission light pulse guided as a reference reflected light pulse to the receiver, wherein the transit-time difference $t_o-t_R$ is used to determine the distance of an object.

2. The optoelectronic apparatus according to claim 1, wherein the evaluation unit includes a time-measurement module for determining the transit-time difference $t_o-t_R$, where a reflected light pulse and the associated reference reflected light pulse are read into separate inputs of the time-measurement module.

3. The optoelectronic apparatus according to claim 2, wherein the inputs of the time-measurement module include a start input and a stop input.

4. The optoelectronic apparatus according to claim 1, wherein the apparatus is used as a safety apparatus in the field of personnel safety, and components of the evaluation unit for determining the transit-time difference $t_o-t_R$ have a single-channel design.

5. The optoelectronic apparatus according to claim 1, wherein the reflection surface extends approximately over the width of the exit window so that in each angular position of the diverting unit, the same portion of a transmission light is coupled out due to reflection by the reflection surface.

6. The optoelectronic apparatus according to claim 1, wherein the reference transmission light pulses are guided entirely inside the housing.

7. The optoelectronic apparatus according to claim 1, further comprising a light waveguide disposed downstream of the transmitter wherein the reference transmission light pulses are coupled into the light waveguide and guided via the waveguide to the receiver.

8. The optoelectronic apparatus according to claim 7, wherein the reference transmission light pulses are guided entirely inside the housing.

9. An optoelectronic apparatus for detecting objects in a monitored region comprising:
   a transmitter that emits transmission light that is guided into the monitored region, the emitted transmission light being in the form of a sequence of transmission light pulses;
   means for coupling out a portion of the light quantity of a transmission light pulse as a reference transmission light pulse;
   a receiver that receives reflected light including transmission light pulses reflected by an object in the monitored region and respective reference transmission light pulses which are guided by way of a reference path to the receiver; and
   an evaluation unit connected to the transmitter and the receiver, said evaluation unit determining transit time $t_o$ of the reflected transmission light pulse, and transit time $t_R$ of the respective, reference transmission light pulse guided as a reference reflected light pulse to the receiver, wherein the transit-time difference $t_o-t_R$ is used to determine the distance of an object and wherein the evaluation unit determines the transit-time difference to $t_o-t_R$ between the reflected transmission light pulse and the respective reference reflected light pulse by quantizing the amplitudes of an analog reflection signal appearing at the output of the receiver, the quantized sequence of reflection signals being read into the individual registers of a memory element at a predetermined rate, and the transit-time difference being determined as the difference between the register positions of the reflected light pulse and the reference reflected light pulse.

10. The optoelectronic apparatus according to claim 9, further comprising a threshold-value unit that converts the analog reflection signals into a binary reflection-signal sequence.

11. The optoelectronic apparatus according to claim 9, further comprising an analog-digital converter having a word width of n bits that quantizes the analog reflection signals.

12. The optoelectronic apparatus according to claim 11, wherein the analog-digital converter has a word width of 8 bits.

13. The optoelectronic apparatus according to claim 11, wherein the evaluation unit determines the position of the maximum or the center of gravity of one of the quantized reflected light pulse and reference reflected light pulse in order to determine the register positions of the reflected light pulse and the reference reflected light pulse.

14. The optoelectronic apparatus according to claim 9, wherein the memory element is formed by one of a semiconductor memory and a CCD array.

* * * * *